(12) United States Patent
Lynch et al.

(10) Patent No.: US 6,203,841 B1
(45) Date of Patent: Mar. 20, 2001

(54) ORGANOLEPTIC WHIPPABLE FOODS WITH IMPROVED TEMPERATURE STABILITY AND IMPROVED WHIPPING PERFORMANCE

(75) Inventors: Robert J. Lynch, Buffalo; John Sean O'Mahony, Clarence Center, both of NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 08/956,619

(22) Filed: Aug. 11, 1997

Related U.S. Application Data

(63) Continuation of application No. 08/548,526, filed on Oct. 26, 1995, now abandoned, which is a continuation of application No. 08/196,334, filed on Feb. 14, 1994, now abandoned.

(51) Int. Cl.[7] .................................................. A23D 7/04
(52) U.S. Cl. ........................ 426/564; 426/573; 426/601; 426/602; 426/603
(58) Field of Search .................... 426/564, 570, 426/573, 601, 602, 606, 571, 572

(56) References Cited

U.S. PATENT DOCUMENTS

| | | | |
|---|---|---|---|
| 3,098,748 | * 7/1963 | Noznick et al. | 426/98 |
| 3,246,992 | * 4/1966 | Noznick et al. | 426/567 |
| 3,944,680 | * 3/1976 | van Pelt et al. | 426/330.6 |
| 3,968,261 | * 7/1976 | Goodman | 426/98 |
| 4,208,444 | * 6/1980 | Gilmore et al. | 426/570 |
| 5,149,557 | * 9/1992 | Morrison et al. | 426/570 |
| 5,244,675 | * 9/1993 | Tulignani | 426/572 |
| 5,290,581 | * 3/1994 | Campbell et al. | 426/570 |
| 5,304,545 | * 4/1994 | Mentink et al. | 554/212 |
| 5,304,546 | * 4/1994 | Comini et al. | 552/545 |
| 5,384,145 | * 1/1995 | Gonsalves et al. | 426/565 |
| 5,384,146 | * 1/1995 | Gonsalves et al. | 426/565 |
| 5,439,697 | * 8/1995 | Gonzalez-Sanz | 426/572 |
| 5,478,588 | * 12/1995 | Talignani | 426/572 |
| 5,486,373 | * 1/1996 | Holt et al. | 426/565 |
| 5,580,491 | * 12/1996 | Phillips et al. | 252/307 |

FOREIGN PATENT DOCUMENTS

| | | |
|---|---|---|
| 0 469 656 A1 | 4/1991 | (EP) . |
| 0 509 579 A1 | 4/1991 | (EP) . |

OTHER PUBLICATIONS

R.J. Lewis, Sr., Hawley's Condensed Chemical Dictionary, VNR Co., New York, 1993, p. 461.*
Baker's Digest, Oct. 1970, vol. 44, No. 5, pp. 60–64.

* cited by examiner

*Primary Examiner*—Curtis E. Sherrer
(74) *Attorney, Agent, or Firm*—Kenyon & Kenyon

(57) ABSTRACT

A whippable food product suitable for preparing a stable whipped confection, comprising an oil-in-water emulsion of (1) a triglyceride fat component wherein at least about 50% or more of the fatty acids thereof are of C14 length or less, (2) water, (3) emulsifier component in an amount that is sufficient to stabilize the product emulsion, and optionally, (4) a protein component that facilitates preparation of or stabilization of the product the, and optionally, (5) one or more additional substances, provided that the triglyceride fat component has a profile of solid fat index of about 70 at 50° F., about 40 to 75 at 80° F., and less than about 20 at 100° F., wherein the product is characterized by providing a whipping overrun of between about 300 and about 500% that can be achieved between about 45° F. and 50° F. in less than about 4 minutes. Additionally, there is provided a method of providing a whippable food product that contains a triglyceride fat component, and an emulsifier component, wherein the fat component has a relatively high melting point characterized by a profile of solid fat index of about 70 at 50° F. about 40 to 75 at 80° F., less than about 20 at 100° F., the method comprising the step of selecting for inclusion into the product an emulsifier component that increases substantially the whipping overrun of the product thereof minimizing the amount of the triglyceride component present in a volume of the product.

31 Claims, No Drawings

ORGANOLEPTIC WHIPPABLE FOODS WITH IMPROVED TEMPERATURE STABILITY AND IMPROVED WHIPPING PERFORMANCE

This application is a filewrapper continuation of application Ser. No. 08/548,526, filed Oct. 26, 1995, now abandoned which is a filewrapper continuation of application Ser. No. 08/196,334, filed Feb. 14, 1994, now abandoned.

FIELD OF THE INVENTION

The present invention relates to whippable food products having desirable organoleptic characteristics, improved temperature stability, and improved whipping performance. According to the practice of the invention, the improvements in the aforementioned products, and in the whipped confections prepared therefrom, are made possible in part through the selection of particular combinations of emulsifiers and triglyceride fats, and optionally proteins and stabilizers, for inclusion therein, and through the techniques whereby the foods are prepared and the confections whipped.

REPORTED DEVELOPMENTS

There is a recognized but unmet demand for whippable food products and confections produced therefrom in which whipping performance and temperature stability are improved, and caloric content is reduced, over available products and confections. This demand is particularly noteworthy with respect to icings and toppings for cakes and tortes, and fillings for creme pies, donuts, eclairs, creme puffs, parfaits and mousses.

With respect to the preparation of large quantities of such products for sale, numerous performance characteristics have been identified improvement of which would improve the value of the product. Representative performance characteristics include greater temperature stability of a whipped confection to weeping, crazing, bleeding, cracking, sliding or, for example, melting from off a cake; greater stability as measured by the time period after preparation of a whipped confection that it remains spreadable; longer shelf life of both unwhipped and whipped products and whipped confections under refrigerated, freezer or ambient temperature conditions; the conditions under which whipping can be performed including time to whip, optimum or maximum whipping temperature, whether whipping can be conducted as a continuous operation, and the overrun yield thereof.

At the same time it is recognized that consumer acceptance of such products, and also the performance and quality thereof, is an important determining factor in the marketplace. In this regard, consumer acceptance is known to be dependent on several and interrelated factors including, for example, cracking, wilting, weeping or hardening of confections; the presence of fresh cream-type taste with rich creamy appearance, and the absence of off-flavors or odors associated with numerous vegetable oils or vegetable oil fractions. In particular, consumer acceptance of such products is also dependent upon the lack of perception by the consumer of a lingering or waxy taste to the above-mentioned products associated with the presence therein of a significant percentage of high temperature-melting triglyceride fat.

It has been suggested that selection for inclusion in such products of particular emulsifiers, stabilizers, water-soluble solids including sweeteners and inorganic salts, proteins (whether or not water soluble), triglyceride fats, and/or combinations thereof, would be key to the preparation of such products and confections, so that improvements in all of the aforementioned areas (temperature stability, perceived organoleptic characteristics, and whipping performance) would be enhanced. Identification of particular combinations of ingredients that provide these performance characteristics has proved difficult.

With respect to the selection of particular triglyceride fats and emulsifiers useful in the preparation of such improved whippable food products, different approaches have been used in the art.

A first approach has been to provide as a starting material for inclusion therein a "temperate latitude" or "domestic" oil including, for example, one or more of soybean oil, canola oil, sunflower oil, corn oil, cottonseed oil, olive oil, peanut oil, rapseed oil, safflower oil, low linolenic soybean oil, low linolenic canola oil, high oleic sunflower oil, or such other similar oils as these terms would be understood in the art, or one or more fractions thereof, such oils being characterized generally as containing no more than about 5% thereof of fatty acids that are of C14 length or less; generally no more than about 15% of C16 length fatty acid; and more than about 50% combined of C18 (saturated, mono, di and tri-unsaturated) fatty acid. Such triglyceride fats are recognized to have certain advantageous features when at least partially hydrogenated including, for example, that they are readily available, that they are of appropriate solid fat index, and have neutral flavor.

However, such oils are recognized to require substantial hydrogenation when used in whipped products. In this regard, it is generally recognized that such domestic oils must be hydrogenated to a resultant iodine value of about 65 to about 75 in order to be useful in the formulation of a stable whip topping, icing or filling. Such oils (for example, soybean oil) result in a fat component which may typically be about 23% saturated C18:0, about 72% monounsaturated C18:1 and about 5% polyunsaturated C18:2 and C18:3.

With respect to formulation of oils of this kind, a most preferred triglyceride composition is believed to be CENTRACOTE® available from Central Soya Company, refined oil division, Fort Wayne, Ind. This product is defined by that company to be a partially hydrogenated soybean oil "selectively processed to give a clean, bland flavor, and extra stability for an extended shelf life" and stated to be suitable, for example, for non-dairy applications such as whip toppings and frozen desserts. The defined characteristics of the product are stated to be iodine value of 65–70, melting point (by the Mettler drop point method) of 105–111° F., with a solid fat index (percent of solid fat) of 59–63 at 50° F., 57–62 at 70° F., 42–47 at 80° F., 22–26 at 92° F. and 1–4 at 104° F. Toppings made from this oil tend to be excessively sensitive to whipping shear, cannot be continuously whipped, have poor whipped stability, and leave a waxy (greasy) coating in the mouth when consumed, referred to in the art as having poor "getaway".

In general, such oils are, if not further refined at substantial cost, recognized as having (1) off-odors uncharacteristic of a dairy topping and (2) the presence therein following hydrogenation of a sufficient concentration of high molecular weight-saturated fat (stearic acid, C18:0, has a melting point of about 158° F.) that they leave a waxy aftertaste in the mouth that coats, but does not easily clear from the palate following tasting thereof.

Emulsifiers that have been used with the above oils include, for example, polysorbate 60, polyglycerol esters, and lecithin, and combinations thereof. Certain advantages have been identified with respect to the use of such emulsifiers. Such products may be freeze-thaw stable, that is, they remain whippable when thawed from the frozen state. However, such products typically have exhibited lack of extended whip stability regardless of whipping conditions used.

An alternate approach to the provision of suitable combinations of triglyceride fat component and emulsifier involves the use of the "high lauric" or tropical oils, as they are known in the art, and that are perceived by consumers to have very desirable cream or butter-like organoleptic properties. Such oils (including hydrogenated forms or fractions thereof) have, typically, very high degrees of saturation, and yet surprisingly low melting points owing to the high contribution to average molecular weight of the triglyceride therein made by the short length C14, C12, and lower carbon fatty acids.

Representative of such good organoleptic oils are babassu oil, coconut oil, tucum oil, palm kernel oil, and any combinations of the above. Inclusion of such oils (including hydrogenated forms or fractions thereof such as partially hydrogenated palm kernel oil, fully hydrogenated palm kernel oil (meaning to an iodine value of about 1), partially hydrogenated coconut oil, fully hydrogenated coconut oil or combinations of any thereof) in the triglyceride fat component of whippable products is recognized to facilitate whippability (including continuous whippability) and to promote stability and presence of desirable organoleptic properties (organoleptic perception) in such products and confections.

Generally, however, such triglyceride fats (unless appropriately hydrogenated), do not provide enhanced temperature stability, a desirable feature for contemporary products. When appropriately hydrogenated, however, they also contribute to undesirable performance or consumer appeal characteristics, such as, waxy mouth feel, poor getaway, etc.

A variety of emulsifiers have been used in combination with these oils including, for example, certain amounts of (and combinations of) polysorbate 60, hexaglycerol distearate, lecithin, and also sodium or calcium stearoyl lactylate.

Accordingly, it has remained undetermined how to manipulate the composition of the triglyceride fat component of whippable food products, or the water-soluble solids, proteins, emulsifiers and stabilizers therein, in order to achieve—simultaneously—the above-mentioned preferred improvements; that is, enhanced temperature stability and whipping performance and stability characteristics in the product, and with respect to confection produced therefrom, enhanced or at least undiminished organoleptic properties, and enhanced temperature stability. These and other benefits are provided according to the practice of the present invention.

SUMMARY OF THE INVENTION

This invention provides for whippable food products having improved whipping characteristics (such as being whippable at near ambient temperatures or after freeze-thaw treatment) from which are prepared whipped confections that have improved temperature and whipped stability, and desirable organoleptic characteristics. An important group of whippable foods and confections that are particularly well suited to be improved according to the practice of the invention are icings, toppings and fillings and particularly those thereof that can withstand freeze-thaw conditions, or ultra high temperature processing, such as in a closed vessel of about 280° F., for example, for a time of 2 seconds.

Accordingly, there is provided a process for preparing a whipped confection comprising the steps of:

(a) preparing a whippable food product itself comprising an oil-in-water emulsion of triglyceride fat component, water, and emulsifier component, wherein said fat component has a profile of solid fat index of about 70 at 50° F., about 40 to 75 at 80° F., and less than about 20 at 100° F., and wherein said emulsion contains, optionally, one or more additional substances, said emulsion being whippable to a whipping overrun of at least about 300%, preferably at least about 400% and most preferably at least about 500%;

(b) whipping said emulsion; and (c) storing the resultant whipped emulsion at a temperature of about 40° F. for about 2 weeks prior to use in a confection, or (c') maintaining said resultant whipped emulsion at about 40° F. for at least about 6 to 8 days after which said product remains stable to visual coarseness and air cell coalescence.

Additionally there is provided a whippable food product suitable for preparing a stable whipped confection, prepared and then processed by the following steps (a), (b):

(a) preparing an oil-in-water emulsion of a triglyceride fat component, water, and an emulsifier component, wherein said fat component has a profile of solid fat index of about 70 at 50° F., about 40 to 75 at 80° F., and less than about 20 at 100° F., and wherein said emulsion contains, optionally, one or more additional substances, said emulsion being whippable to a whipping overrun of at least about 300%, preferably at least about 400%, and most preferably at least about 500%; wherein the emulsion of step (a) has been further processed by (B1) continuous whipping at between about 450 and about 60° F.; or (B2) whipping, and then preparation as a whipped confection that is maintained on a cake for at least about 7 days if maintained at 40° F., or for at least about 10 days if maintained at 40° F. in a bowl, in either case without crazing; or (B3) being whipped and prepared as a microbiologically stable cake icing or topping that is maintained for up to about 5 days at 80° F., and remains stable to melting, sliding, bulging, blistering or sagging or crazing on said cake; or (B4) being maintained for about 1 year or longer or about 0° F. prior to the whipping thereof; or (B5) being whipped and prepared as a confection that is maintained for about 5 days, or longer, at about 80° F.; or (B6) being whipped and prepared as a confection that is maintained for about 2 weeks or longer at or below 40° F.; or (B7) maintenance for about 1 year or longer at or below 5° F., including when present in a mixed confection such as a mousse; or (B8) being provided as a non-microbiologically stable whipped topping that is itself stable to visual coarseness and air cell coalescence after maintenance of at least about one hour at room temperature, and remaining extendable and spreadable, and capable of being made into rosettes of acceptable quality that can themselves be stored subsequently for at least about 6 days at 40° F., or themselves be stored frozen and then thawed with subsequent storage at 40° F. for at least 4 days.

There is also provided a whippable food product suitable for preparing a stable whipped confection, comprising an oil-in-water emulsion of (1) a triglyceride fat component wherein at least about 50% or more of the fatty acids thereof are of C14 length or less, (2) water, (3) emulsifier component in an amount that is sufficient to stabilize said emulsion, and optionally, (4) a protein component that enhances the whipping performance or whipped stability of said product or said confection, and optionally, (5) one or more additional substances, provided that said triglyceride fat component has a profile of solid fat index of about 70 at 50° F., about 40 to 75 at 80° F., and less than about 20 at 100° F., wherein said product is characterized by providing a whipping overrun of between about 300 and about 500%.

Preferably, the emulsifier component stabilizes the emulsion while contributing to good whipping properties of product and confection such as:

(a) a shelf life after whipping of about 5 days, or longer, when maintained at or about 80° F.;

(b) a shelf life after whipping of about 14 days or longer when maintained at or below 40° F.;

(c) a shelf life after whipping of about 1 year or longer when maintained at or below about 0–5° F.; and (d) stability of confection to crazing on an iced cake for at least about 10 days if maintained at about 40° F.;

(e) stability of confection to visual coarseness and air cell coalescence at room temperature for at least about two hours when said confection is provided in the form of a non-microbiologically stable whip topping;

(f) stability of confection to visual coarseness and air cell coalescence when maintained at about 40° F. for at least about six to eight days;

(g) stability for up to at least about 5 days time at 80° F. from melting, sliding, or crazing when provided as a microbiologically stable whipped icing or topping on a cake; and (h) stability for about one year at 60° F. or below for a product in either its whipped or unwhipped form, when packaged employing aseptic conditions.

In this regard, a most preferred emulsifier is sodium stearoyl lactylate.

Typically, the triglyceride fat component of the product will have a solid fat index ("SFI", percent of solid fat) of about 70 at 50° F., about 40 to 75 at 80° F., and less than about 20 at 100° F. A preferred triglyceride fat is palm kernel oil hydrogenated to an iodine value of about 1. This fat is characterized by a Wiley melting point of 113° F. and a solid fat index profile of 73 at 50° F., 49 at 80° F. and 9.8 at 100° F. A further preferred embodiment is represented by triglyceride fat as about 98% of palm kernel oil hydrogenated to an iodine value of about 1 and about 2% (w/w) of fully hydrogenated stearine fraction of palm oil.

According to the practice of the invention, said whippable food may contain as triglyceride fat component, fat provided from more than one fraction, for example, from a first fraction that comprises a fat selected from the group consisting of palm kernel oil, coconut oil, tucum oil, or a partially hydrogenated, hydrogenated, or winterized fraction of one or more thereof. According to this aspect of the invention, said second fraction of fat thereof comprises, for example, a fat selected from the group consisting of palm oil, cottonseed oil, lard, tallow, or a stearine fraction of any thereof.

It will be appreciated that the triglyceride fat component of such whippable products and whipped confections can be achieved through the provision of or blending of various other different fats or single, second and multiple fractions thereof. Representative combinations of triglyceride fats, the use of which being within the practice of the invention, are also described below.

Additionally, there is provided a whippable food product that is microbiologically stable wherein a confection produced therefrom is capable of being provided as a whipped cake icing or topping that is itself stable for up to at least about 5 days time at 80° F. from melting or sliding, or crazing on said cake.

A further aspect of the invention provides a whippable food product wherein a confection having consumer-acceptable organoleptic characteristics produced therefrom is capable of being provided as a non-microbiologically stable whip topping that is itself stable to visual coarseness and air cell coalescence when maintained at about 40° F. for at least about six to eight days.

There are provided also methods wherein by the compositions of the invention may be produced including, for example, a process of providing a whippable food product suitable for preparing whipped confections, that can be pumped and whipped in a continuous aerator at up to a temperature of about 50° F., said product being then substantially stable to air cell coalescence for at least about 2 weeks at about 40° F.

Additionally there is provided a method of providing a whippable food product having consumer acceptable organoleptic properties that contains a triglyceride fat component, and an emulsifier component, wherein said fat component has a relatively high melting point characterized by a profile of solid fat index of about 70 at 50° F., about 40 to 75 at 80° F., less than about 20 at 100° F., said method comprising the step of selecting for inclusion into said product an emulsifier component that increases substantially the whipping overrun of said product, thereby minimizing the amount of said triglyceride component present in a volume of said product.

Accordingly, the caloric content of product can be reduced.

Additional aspects of the invention are described in connection with the detailed description of the invention that follows directly.

DETAILED DESCRIPTION OF THE INVENTION

Introduction

This invention is directed to the preparation of high performance whippable food products suitable for preparing improved whipped confections. The food products of the invention possess improved whipping characteristics and improved temperature stability wherein whipped confections produced therefrom have improved organoleptic characteristics and also improved temperature stability. As described below, important aspects of the invention include also new methods for the formulation of aforementioned compositions, and methods for the manipulation thereof.

With respect to design of whippable food products and confections according to the practice of the present invention, selection of amounts of many ingredients thereof follows generally from information available to those familiar with the art. This invention provides in particular for certain whipped products and confections that present, for example, the aforementioned whipping and stability characteristics. Without being limited as to theory, it is believed that the particular combinations of triglyceride fats, emulsifiers and proteins contribute in combination to the substantial performance improvements provided according to the practice of the invention.

Representative specific improvements (and combinations of improvements) for whipped food products and confections that are achieved according to the practice of the invention include:

(A) unwhipped liquid product that has improved stability (as measured by the length of a period of maintenance at refrigerated temperature, or a temperature up to about 60° F.) following which the product can be whipped;

(B) food product that can be continuously whipped at between about 45 and about 60° F.;

(C) food product that has high whipping overrun, such as between 300 and 500 percent, and preferably between 400 and 500 percent;

(D) food product that has an overrun (C) that can be achieved at between 45° F. and 60° F.;

(E) food product that has an overrun (C) that can be achieved in less than about 4 minutes (F) food product that has an overrun (C) that can be achieved in less than about 10 seconds using a work input rate during continuous whipping of between about 24 and about 30 watt seconds per pound, the resulting whipped confection being stable to air cell coalescence for at least about 10 days if maintained at about 40° F., and wherein a similar overrun can be achieved in about 4 minutes at low work input in a HOBART-type whipping unit;

(G) whipped confection produced from food product is stable to crazing on a cake for at least about 7 days if maintained at about 40° F., or for at least about 10 days if maintained at 40° F. in a bowl;

(H) food product that is provided in the form of a microbiologically stable whipped cake icing or topping is stable for up to at least about 5 days at 80° F. from melting, sliding, bulging, blistering or sagging or crazing on said cake;

(I) food product that has a shelf life, prior to whipping, of about 1 year or longer when maintained at or about 0° F.;

(J) with respect to BETTERCREME® (Rich Products Corporation, Buffalo, N.Y., see also, for example U.S. Pat. Nos. 4,146,652 and 4,387,109) type product of high solids content (for example about 60% solids, see Example 1), food product wherein confection produced therefrom has a shelf life after whipping, of about 5 days, or longer, when maintained at or about 80° F.;

(K) food product wherein confection produced therefrom has a refrigerated shelf life, after whipping, of about 2 weeks or longer when maintained at or below 40° F.;

(L) food product (or confection produced therefrom) that has a frozen shelf life, after whipping, of about 1 year or longer when maintained at or below about 0 to 5° F.;

(M) food product wherein a confection having consumer-acceptable organoleptic characteristics produced therefrom is capable of being provided as a non-microbiologically stable whip topping that is itself stable to visual coarseness and air cell coalescence at room temperature for at least about one hour and remains extendable and spreadable, and capable of being made into rosettes of acceptable quality;

(N) whippable food product wherein a confection having consumer-acceptable organoleptic characteristics produced therefrom is capable of being provided as a non-microbiologically stable whip topping that is itself stable to visual coarseness and air cell coalescence when maintained at about 40° F. for at least about six to eight days;

The importance of the present development is based in part upon the discovery that the combinations of triglyceride fat components, water soluble solids including particular proteins, and emulsifier compositions provided according to the practice of the invention confer the above-mentioned superior performance characteristics upon foods of the oil-in-water emulsion type such as butter creams, fillings, icings, and whipped toppings, and in recipes derived therefrom.

COMPONENTS OF THE PRODUCTS AND CONFECTIONS OF THE INVENTION

In connection with describing the whippable fillings, icings, toppings, butter creams, and other foods of the invention, there is first provided a general discussion of the ingredients that may be found in such whippable products. Emulsifiers and shortenings (triglyceride fat) are important ingredients in the above-identified whippable food products. A survey of the general properties thereof is provided by Moncrieff, J. Shortenings and Emulsifiers for Cakes and Icings, *The Bakers Digest,* October 1970, pp. 60–64.

Briefly, the specific properties of shortenings used in such products affect numerous properties of potentially whippable products, such as by determining the solid fat index (reflecting the ratio of solid to liquid triglyceride fat component at particular temperatures), the structural form of triglyceride as represented, for example, by average molecular weight of fatty acids therein, the makeup of the individual triglycerides in the oil and the ratios of the different triglycerides to one another. A key aspect of the invention involves the recognition of certain beneficial combinations of emulsifiers and triglyceride fats and other ingredients, including, for example, water soluble sweeteners, buffering salts, and proteins (particularly water-soluble proteins).

Water Soluble Solids

The term "water soluble solids" is used to apply to any additive material which is substantially soluble in water at room temperature or at temperatures comparable to those practiced in processing the ingredients of the foods. Included in the class of water soluble non-sugar solids that can be employed are certain inorganic salts used at a level compatible with palatability requirements, e.g., sodium chloride, sodium dihydroxyphosphate and other phosphate buffering salts, and potassium chloride. Certain compounds used in this regard, such as the diols and polyols, propylene glycol, sorbitol, glycerol and the like which have another function, i.e., as an anti-mycotic (such as potassium sorbate) and/or texturizer, may also be relied upon to provide the soluble solids (or solutes) employed in the aqueous phase for bacteriostatic protection. Propylene glycol is prominent in this respect since it is capable of serving a multiple role as mold inhibitor and plasticizing humectant for texture as well as contributing to the water soluble solids of the aqueous phase. The higher diols, such as the aliphatic 1,3-diols containing four to fifteen carbon atoms in the aliphatic chain and their esters which are completely metabolized, can also be used, and sugar-substitutes such as corn sweeteners, sugar alcohols, and non-nutritive sweeteners (such as NUTRASWEET® and cyclamate) are also useful. The above-mentioned diols also assist in maintaining the foods in a bacteriostatic and mycostatic state while providing softness or plasticity to the formulations. These materials are stable, non-volatile, with good storage and shelf life, appreciable water solubility, and are readily emulsified and formulated into various food preparations. Additional components include bulking agents such as polydextrose, to reduce caloric content.

Proteins

Milk proteins such as isolated sodium, potassium or calcium caseinates, protein provided as skim milk, nonfat dry milk, milk protein concentrate, whey protein concentrates, alpha lactalbumin and beta lactoglobulin are preferred, and assist in emulsification and stability of the resultant whipped product. Vegetable proteins such as soya protein, pea protein, wheat protein, cottonseed protein, peanut protein, and corn protein are also useful. Meat proteins derived as soluble proteins from meat processing may also be used according to the practice of the invention.

Emulsifiers

Emulsifiers are, by definition, necessary ingredients to the oil-in-water emulsions of the invention. A wide variety of emulsifiers may be employed in amounts on the same order as in the prior art oil-in-water emulsions, for example, about from 0.1% to 5%, preferably about from 0.2% to 1.5%. They induce the formation of a stable emulsion and improve the rate and total aeration (whipping overrun) obtained. Among the more suitable are: lecithin, hydroxylated lecithin; mono, di, or polyglycerides of fatty acids, such as stearin and palmitin mono and diglycerides, polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; polyglycerol esters of mono and diglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and the like, and mixtures thereof.

The emulsion compositions of the present invention may also include one or more stabilizers of hydrophilic colloids to improve the body and texture of toppings, to reduce whipping time, to increase whipped stability, and as an aid in providing freeze-thaw stability. These stabilizers are natural, i.e. vegetable, or synthetic gums and may be, for example, carrageenin, guar gum, alginate, xanthan gum and the like or methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g. dextrose, carrier. The amount of these stabilizers can be varied widely in accordance with the amounts required in prior art compositions, generally about from 0–2%, preferably about 0.1–0.5%.

A standard mixture of mono and di-glycerides is used in many formulations. It is sold under the name BFP No. 74K by American Ingredients of Kansas City, Mo., and contains about 43% alpha mono content. It has an I.V. of 2.5, a melting point of 140° F., and is manufactured by the glycerolysis of animal or vegetable based fats.

TENDEREX emulsifier is a mixture containing polysorbate 60 (11.9%), sorbitan monostearate (31.6%), mono and diglycerides of fatty acids (2.3%), propylene glycol (9.5%), and water (44.3%).

In one preferred aspect according to the description which follows, with respect to preparation of whipped topping (Example 4), a narrow range of between 0.4 and 0.5 weight % of sodium stearoyl lactylate emulsifier was determined to provide a preferred composition.

Colors and Flavors

Colors useful in the practice of the invention includes any of those recognized as useful in the art including beta carotene, annatto tumeric, cochineal dyes, aromatic dyes such as yellow No. 5 and yellow No. 6 and/or combinations of any of the above.

Additionally, flavors useful in the practice of the invention include any that are useful in art including, for example, natural vanilla, artificial vanilla, burnt sugar, natural cream flavor, boiled milk flavor, natural milk flavor, caramel flavor, butterscotch flavor, nata flavor, and artificial and nature identical flavors of the above and combinations thereof to provide desired end product flavor.

Triglyceride Fat Component of the Invention

A characteristic and novel feature of the whippable food product compositions of the invention is that triglyceride fat component thereof contributes substantially to the stability thereof at elevated temperatures, and to the organoleptic characteristics of confections derived therefrom. Resultant compositions typically demonstrate improved or at least undiminished whipping characteristics and also increased temperature stability.

As will be described in greater detail below, a particular aspect of the invention involves incorporation into the products of the invention of advantages provided by "high lauric" or tropical oils while compensating for disadvantages (for example, waxy mouth feel) resulting from the use of hydrogenated forms thereof.

Additionally, the triglyceride fat component of the product typically will have a solid fat index ("SFI", percent of solid fat) of about 70 at 50° F., about 40 to 75 at 80° F., and less than abut 20 at 100° F. A preferred triglyceride fat is palm kernel oil hydrogenated to an iodine value of about 1. This fat is characterized by a Wiley melting point of 113° F. and a solid fat index profile of 73 at 50° F., 49 at 80° F. and 9.8 at 100° F. A further preferred embodiment is represented by triglyceride fat as about 98% of palm kernel oil hydrogenated to an iodine value of about 1 and about 2% (w/w) of fully hydrogenated stearine fraction of palm oil.

According to the practice of the invention, said whippable food may contain as triglyceride fat component, fat provided from more than one fraction, for example, from a first fraction that comprises a fat selected from the group consisting of palm kernel oil, coconut oil, tucum oil, or a partially hydrogenated, hydrogenated, or winterized fraction of one or more thereof. According to this aspect of the invention, said second fraction of fat thereof comprises, for example, a fat selected from the group consisting of palm oil, cottonseed oil, lard, tallow, or a stearine fraction of any thereof.

One aspect of the present invention provides for the blending of particular combinations of triglyceride fat (a first fraction and at least a second fraction) wherein the small amount of triglyceride fat of said second fraction (a hardening fat) contributes to the whipped stability at elevated temperatures of said product and confection respectively without detracting substantially from the organoleptic properties contributed by said first fraction.

As aforementioned, tropical or high lauric fats (oils) are recognized in the art for the desirable organoleptic properties that they contribute to confections. For the purposes of the invention a high lauric fat is defined as having about 40% or higher of the total fatty acid content thereof contributed by C14, C12 and smaller acids. Included within the definition of organoleptic properties, according to the practice of the invention, are those sensory and physical properties that cause such products to be appreciated or preferred by consumers and include, for example, cream or butter-like taste and fragrance, lack of an off-odor or taste characteristic of many vegetable oil products, and that they leave little waxy taste that does not easily clear from the palate. Such waxiness is attributed to triglycerides having high melting points, such as a Wiley melting point of above about 110° F., or Mettler drop point of 108° F., taking into consideration that the contribution that any particular fat makes to the product or confection containing same depends on the fractional percentage of triglyceride component that is represented thereby.

Additionally, high lauric fats are recognized as making an important contribution to the whippability of product containing same.

As aforementioned, such otherwise desirable high lauric fats (oils) have low melting points that affect adversely the temperature stability of products and confections therefrom. This invention provides for mixtures of fats that preserve the desirable contributions to whippable products and resultant confections made by high lauric fats. Representative triglyceride fat components preferred according to the practice of the invention, as represented by the final (combined) fatty acid profiles, are described in the Example section that follows.

In this regard it has been determined that certain weight ratios of particular second fractions of fat to first fractions of lauric fat are particularly effective to produce improved product.

Without being limited as to theory it is believed that inclusion in said triglyceride fat component of particular amounts of high melting fat increases the temperature stability of said product containing same while being in insufficient quantity to affect adversely the organoleptic properties thereof, and while potentially improving one or more desirable whipping characteristics thereof. In this regard, the solid fat index properties of a fat are of particular importance, and it is believed that facilitating the entry of fine bubbles of gas into product (whipping), and, for example, the length of time for which said whipped state remains stable, are both dependent on the simultaneous presence of particular quantities of both solid and also liquid triglyceride fat at each temperature where maintenance of the whipped state is desired. In this regard, it has been discovered also that the saturated C16 and C18 content of the aforementioned second fraction of triglyceride fat is particularly important in determining the performance thereof. Without being limited as to theory, it appears also that the presence (such as in palm or cottonseed oil) of a high ratio of amount of saturated C16 fatty acid to the amount of saturated C18 fatty acid in said product (such as about 1 to 2) is sufficient to provide enhancement of temperature stability without inhibiting the organoleptic properties of said product or said resultant confection, for example not contributing to waxiness.

Accordingly, the invention provides for triglyceride fat component in product comprising a first fraction of fat wherein at least about 40% or more of the fatty acids thereof are of C14 length or less, and a second fraction of fat wherein at least about 50% or more of the fatty acids thereof are of C16 length.

Additionally, the invention provides for triglyceride fat component comprising a first fraction of fat wherein at least about 40% or more of the fatty acids thereof are of C14 length or less, and a second fraction of fat wherein no more than about 10% or more of the fatty acids that are of C14 length or less.

In preferred form, a whippable food product is provided wherein the triglyceride fat component thereof comprises between about 92 and about 100 weight percent of a first fraction, itself consisting essentially of hydrogenated or partially hydrogenated palm kernel oil (or coconut oil), and between about 0 and about 8 weight percent of a second fraction, itself consisting essentially of hydrogenated or partially hydrogenated palm oil, wherein the solid fat index at 80° F. of said first fraction is about 50, the solid fat index at 80° F. of said second fraction is about 100, and the solid fat index of said combined first and second fractions at 80° F. is about 49.

In this regard, Example 5, as provided below, describes representative triglyceride compositions of the above using mixtures of highly hydrogenated palm kernel oil or a stearine fraction thereof, in combination with highly hydrogenated stearine fraction of palm oil. Advantageous properties of the above are described according to Example 5. Examples 6 to 11 describe solid fat index properties of compositions representative of those as useful in the practice of the invention.

Additionally, a whippable food product is provided having a whipping time as measured by whipping with a wire whip in an electrically operated HOBART or KitchenAid whipping unit, of less than about five minutes at high speeds wherein a whipped confection produced therefrom is stable to air cell coalescence for at least about 10 days if maintained at about 40° F.

Combined Use of Triglyceride Fats, Proteins, and Emulsifiers According to the Practice of the Invention Without being limited as to theory it is believed that the use of particular combinations of triglyceride fats, proteins and emulsifiers in the whippable products of the invention accounts in part for their substantially improved whipping performance capabilities and, for example, temperature stability.

Contributing to the success of ingredient combinations according to the practice of the invention is the selection of particular emulsifier compositions. Representative emulsifiers useful in the practice of the invention include polyglycerol esters of fatty acids (HGDSK), polysorbate 60, lecithin, mono and diglycerides, sodium stearoyl lactylate, and sorbitan monostearate. Of importance in the selection of emulsifiers is the hydrophilic/lipophilic balance assigned thereto (HLB value). In general, a lower HLB value refers to an emulsifier or emulsifier composition that prefers a hydrophobic environment whereas a higher number is generally representative of an emulsifier or emulsifier composition preferring a more hydrophilic environment. Representative values for the above-mentioned emulsifiers are as follows, polyglycerol esters of fatty acids (HGDSK) (about 4.0); polysorbate 60 (about 14.5); lecithin (about 4.0 but variable); mono and diglycerides (about 3.0); sodium stearoyl lactylate (about 21.0); and sorbitan monostearate (about 4.7).

According to the practice of the invention the following are suggested as guidelines with respect to the selection of particular emulsifier compositions.

(1) Generally, if the product is to be sold as a prewhip product or is capable of being whipped continuously, then it tends to be preferred to use for example, polysorbate 60/sorbitan monostearate in a ratio of about 6 to 4.

(2) Generally, if the product is a BETTERCREME® whipped topping or icing it may be advantageous to utilize sodium stearoyl lactlyate, in conjunction with milk protein caseinate at a concentration of protein of about 0.5%. A representative emulsifier concentration therewith is about 0.46% which in the context of BETTERCREME® products provides better performance than an emulsifier system of (w/w) poly aldo HGDSK (0.1%), lecithin (0.1%) and GLY-COSPERSE® (0.28%) used in connection with a concentration of sodium caseinate of about 1.25% and containing also soya concentrate.

(3) Emulsifier compositions providing mixtures of lecithin, HGDS (HGDSK), and also polysorbate 60 or sorbitan monostearate are useful in the practice of the invention. See for example, Example 1. An additional composition useful in the practice of the invention involves use of HGDS (HGDSK) in combination with polysorbate 60 and mono and diglycerides.

Selection of emulsifier compositions is affected by the selection of protein compositions to be used in conjunction therewith. In general, the following serve as a guide to the selection of appropriate amounts and types of protein and emulsifier components. Generally, it is expected that emulsifier compositions that are relatively hydrophobic having low HLB values benefit from the presence of additional quantities of protein and in particular soluble protein. Preferred examples include milk protein caseinates and other milk protein fractions which provide a broad range of plasticity to products of the invention. With respect to BETTERCREME® products, for example, milk protein such as caseinates contribute stability to the whipped product once the emulsion has been established. It has been noted also that the involvement of protein in stabilizing the emulsified compositions of the invention may in certain important aspects be related to the special role that milk proteins play in the stabilization of fat in dairy products such as homogenized milk.

The role of proteins in stabilized compositions of this invention may perform a function similar to the role performed by milk proteins in stabilizing fat present in homogenized milk, and other dairy products. Consistent therewith, one may well seek to optimize the products of this invention by selection of particular protein species and the relative amounts thereof selected for use. In one embodiment of this invention, (e.g., see Example 13) desirable properties are obtained when a ratio of about 2.4 grams of proteins per 100 grams of fat emulsified therewith is used. This ratio approximates the ratio of comparable fat and protein components found in intimate association in stable homogenized milk. Accordingly, one may use herein, weight ratios of protein to 100 grams of fat present of about 1 to about 9, or preferably, about 2 to about 3.

U.S. Pat. Nos. 4,146,652 and 4,387,109 is incorporated herein by reference. The fats, emulsifiers, and protein compositions described in the present application may also be formulated in accordance with the teachings of the above-incorporated Patent and in U.S. Pat. No. 4,146,652 including use of the sweeteners and water soluble components described, such as HFCS, corn syrups, and other sweeteners described therein. In addition, use of non-nutritive and/or reduced caloric components, including non-nutritive sweeteners, may be employed herein.

Batching Techniques

The batching process may be selected to suit the needs of the processor. If desired, batching may be carried out by recirculating liquid components through a heating device, such as a heat exchanger or a shell and tube type mechanism. Powder ingredients may be introduced into the liquid stream by, for example, a venturi-type mechanism, and by further circulating the mixture through the heat exchanger until fully mixed. Subsequently or simultaneously, the resultant mixture may be pasteurized at a suitable temperature. Alternatively, one may employ a continuous mixing apparatus employing pre-prepared solutions of the various components, and co-mingling them through high speed agitation in a suitable vessel, or alternatively, co-mingling them by continuously circulating the solutions of components through a static mixer enclosed within a run of pipe to ensure adequate mixing of all ingredients.

Aseptic Processing

An additional advantage of the whippable products of the invention is that they can be subjected to ultra high temperature treatments and aseptic processing with advantageous results.

In a representative embodiment product is processed in a plate heat exchanger or in a narrow tubular system using bundles of tubes. The product flow is surrounded by high pressure steam or hot water in a closed system. Processing of product is typically accomplished at about 280° F. for about 2 seconds with subsequent cooling to about 40° F.

Typically, product of the invention (including whipped toppings, BETTERCREME® product and prewhips) processed by ultra high temperature processing and packaged in a clean packaging system ensures at least about 60 to 70 days of shelf life when stored at 40° F.

Such packaging systems are known in the art, for example, using model equipment EQ3 and EQ4 of Cherry Burrell and include the capacity to incorporate vaporized hydrogen peroxide treatment for sterilization. Accordingly, packages are typically received as preformed blanks which are erected and treated in the packaging equipment. More effective stabilization of the packages (including bathing in hydrogen peroxide, followed by flashing thereof) contributes substantially to storage of aseptic product that can be held for at least one year at about 50 to 60° F.

ADDITIONAL EMBODIMENTS OF THE INVENTION

A whippable food product suitable for preparing a stable whipped confection, comprising an oil-in-water emulsion of (1) a triglyceride fat component wherein at least about 50% or more of the fatty acids thereof are of C14 length or less, (2) water, (3) emulsifier component in an amount sufficient to stabilize said emulsion, and optionally, (4) a protein component that facilitates preparation of or stabilization of said confection, and optionally, (5) one or more additional substances, provided that said triglyceride fat component has a profile of solid fat index of about 70 at 50° F., about 40 to 75 at 80° F., and less than about 20 at 100° F., wherein a confection having consumer-acceptable organoleptic characteristics produced therefrom is capable of being provided as a non-microbiologically stable whip topping that is itself stable to visual coarseness and air cell coalescence at room temperature for at least about two hours.

A food product wherein said overrun can be achieved in less than 10 seconds using a work input rate during continuous whipping of between about 24 and about 30 watt seconds per pound, wherein whipped confections produced therefrom are stable to air cell coalescence for at least about 10 days if maintained at about 40° F.

A whippable food product that can be continuously whipped at between about 47° F. and about 59° F.

A whippable food product wherein a confection having consumer-acceptable organoleptic characteristics produced therefrom is capable of being provided as a non-microbiologically stable whip topping that is itself stable to visual coarseness and air cell coalescence when maintained at about 40° F. for at least about six to eight days.

A whippable food product that is microbiologically stable comprising an oil-in-water emulsion having from 15 to 45% water, sugar in a ratio to water of about 1–2:1, about from 2.5 to 45% fat, and minor but effective amounts of salt, emulsifier, stabilizer and flavoring, provided that the amount of fat is less than the amount of water, the solutes content is adequate to provide the product with a water activity of about from 0.8 to 0.9, in said sugar the amount of dextrose plus fructose is at least about 50% based upon the total sugar content. Additionally, whippable food products and whipped confections, as above, further characterized by a water activity of about 0.75 to 0.93, preferably, 0.8 to about 0.9.

A whippable food product wherein said triglyceride fat component thereof comprises at least about 90% (w/w) of a first fraction of fat wherein at least about 50 or more of the fatty acids thereof are of C14 length or less, and about 10% (w/w) or less of a second fraction of fat wherein at least about 50% or more of the fatty acids thereof are fully saturated and of C16 or C18 length, and wherein at least about 20% of said fully saturated fatty acids thereof are of C16 length.

A method of providing a whippable food product is also provided wherein said product can be maintained as an unwhipped liquid at about 40° F. for at least about 5 to 7 days prior to whipping thereof, or can be maintained as an unwhipped liquid at about room temperature for at least about 1 to 2 days prior to the whipping thereof.

The following Examples are representative of the practice of the invention.

EXAMPLES

EXAMPLE 1 Preparation of an Improved Butter Creme-Type Icing Product That Can Be Frozen, Thawed, and Then Whipped In A Continuous System And Does Not Melt or Slide Off Iced Cakes Stored at 80° F.

| A. Ingredient | Ingredient Description | Weight % |
|---|---|---|
| (1) | Modified Palm Kernel Oil | 24.2300 |
| (2) | Lecithin | 0.1000 |
| (3) | Potassium Sorbate | 0.1000 |
| (4) | Instant FREEZE FLO ® vanilla BETTERCREME ® | 2.2300 |
| (5) | Water | 20.8090 |
| (6) | Corn Syrup | 51.9950 |
| (7) | Salt | 0.1400 |
| (8) | Polysorbate 60 | 0.2800 |
| (9) | POLY ALDO HGDSK | 0.1000 |
| (10) | Artificial vanilla flavor | 0.0160 |
| | | 100.00% |

Certain of the ingredients described above in abbreviated form, are: instant FREEZE FLO® vanilla BETTER-CREME® Premix, Rich Products Corp., Buffalo, N.Y., (see below for recipe); ISOCLEAR 42, HFCS, high fructose corn syrup, Cargill, Dayton, Ohio; polysorbate 60 as product GLYCOSPERSE S20K, Lonza Co., Fairlawn, N.J.; Artificial Vanilla flavor product 143-12700 from Bell Flavors, Northbrook, Ill.; and polyglycerol esters of fatty acids (POLY ALDO HGDSK) from Lonza, Fairlawn, N.J.

The oil component thereof (Neutresca® 75-46, Aarhus, Inc., Port Newark, N.J.) which contributes 24.23% of the total weight of the product was a blend of 98% (w/w) palm kernel oil hydrogenated to an iodine value of about 1, and 2% (w/w) of the (fully) hydrogenated form of the stearine fraction of palm oil. By fully it is meant that hydrogenation is as complete as commercially practicable. The resultant fatty acid profile thereof is also shown directly below.

| Fatty Acid Profile | | |
|---|---|---|
| Caprylic | C08 | 3.5 |
| Capric | C10 | 3.5 |
| Lauric | C12 | 47.4 |
| Myristic | C14 | 15.7 |
| Palmitic | C16 | 8.4 |
| Stearic | C18:0 | 16.5 |
| Oleic | C18:1 | 5.1 |
| Linoleic | C18:2 | 0.0 |
| Linolenic | C18:3 | 0.0 |

A 5000 pound quantity of the above-described TROPIR-ICH® product was prepared according to the following procedure. A 162 gallon quantity (1,212 lbs.) modified palm kernel oil (product Neutresca® 75-46 of Aarhus, Inc., Port Newark, N.J.) was metered into a steam-jacketed pasteurizer set on medium agitator speed. 5 pounds of lecithin was added back to approximately 1 gallon of the oil and then added back into the batch. 5 pounds of potassium sorbate was then added to the batch and mixed at low speed for 30 seconds. Two bags (a total of 111.5 pounds) of FREEZE FLO® vanilla BETTERCREME® premix were then dispersed completely into the oil with mixing. The premix (itself prepared according to the protocol described at the end of this Example) comprises (w/w) 55.975% sodium caseinate, 7.245% granulated sugar, 1.8% KELTROL T® xanthan gum, Kelco Co., 4.48% artificial vanilla flavor powder, 18.8% soy protein (PROMOSOY 100, supplied by Central Soya, Fort Wayne, Ind.) and 11.7% of a hydrocolloid stabilizer METHOCEL F50 Premium, hydroxypropylmethyl-cellulose, Dow Chemical Co., Midland, Mich.

128 gallons (1040 lbs) of hot water was then metered into the pasteurizer with mixing at high speed. The resultant mixture was then brought to 165° F. and while the heating was performed, the following additional components were added and dissolved: (1) by metering, 232 gallons (2600 pounds) of high fructose corn syrup (42% fructose and 70 percent solids); (2) 7 pounds of salt; (3) 14 pounds of polysorbate 60; and (5) 5 pounds of POLY ALDO HGDSK, supplied by Lonza.

Heating was then continued to 165° F. by turning off the heating unit at 161° F. and maintaining heat for 5 minutes. Finally, 0.8 pound of artificial vanilla flavor (product 143.12700 of Bells) was added, the mixture was homogenized through a two-stage homogenization, first stage 3000 p.s.i., and the mixture was then cooled by passage through a heat exchanger to a temperature of 38° F. to 50° F. prior to packaging for storage at −5 to 0° F., or at 40° F. prior to final use.

Icings prepared using the material of this Example are stable when used on iced cakes at 80° F. for 5 days, a performance much superior to composition (B) below in which the oil thereof is 95% of palm kernel oil hydrogenated to an iodine value of about 4, and 5% partially hydrogenated (iodine value of 104 to 110) soybean oil, or composition (C) wherein the oil was 100% palm kernel oil hydrogenated to an iodine value of 4.

| B. Ingredient | Ingredient Description | Weight % |
|---|---|---|
| (1) | Modified palm kernel oil | 19.4600 |
| (2) | Modified soybean oil | 5.0400 |
| (3) | Lecithin | 0.0100 |
| (4) | Potassium Sorbate | 0.1000 |
| (5) | Vanilla BETTERCREME ® Premix | 2.2300 |
| (6) | Water | 20.0540 |
| (7) | Corn Syrup | 52.4800 |
| (8) | Salt | 0.1400 |
| (9) | Polysorbate 60 | 0.2800 |
| (10) | POLY ALDO HGDSK | 0.1000 |
| (11) | Artificial Vanilla Flavor | 0.160 |
| | | 100.00% |
| C. Ingredient | Ingredient Description | Weight % |
| (1) | Hydrogenated vegetable oil | 24.2300 |
| (2) | Lecithin | 0.1000 |
| (3) | Potassium Sorbate | 0.1000 |
| (4) | Vanilla BETTERCREME ® Premix | 2.2300 |
| (5) | Water | 20.3250 |
| (6) | Corn Syrup | 51.9950 |
| (7) | Salt | 0.1400 |
| (8) | Polysorbate 60 | 0.2800 |
| (9) | POLY ALDO HGDSK | 0.1000 |
| (10) | Artificial vanilla flavor | 0.5000 |
| | | 100.00% |

Preparation of Vanilla BETTERCREME® Premix

BETTERCREME® premix as used above was prepared according to the following formula. The following ingredients were placed in a ribbon blender: sodium caseinate, 616 lbs; granulated sugar, 80 lbs; xanthan as product KELTROL T® of Kelco Company, 19.8 lbs; artificial vanilla flavor powder, from Bells Flavors and Fragrances, 49.3 lbs; soy protein as product PROMOSOY 100 of Central Soya, 207 lbs; and hydroxy-propylmethylcellulose as product METHOCEL F-SO premium of Dow Chemical Company, 128 lbs. After placing the ingredients into the mixer, it was blended for 15 minutes and bagged at about 55.75 lbs. per bag.

It has been determined also that a further improved butter creme type icing product can be made by substituting as triglyceride fat component 100 percent of palm kernel oil, unfractionated and hydrogenated to an iodine value of 1; as emulsifier component, the single substance, sodium stearoyl lactylate used at a final concentration of 0.46% (w/w) for example, product EMPLEX® available through American Ingredients, Kansas City, Mo.; and sodium caseinate at 0.6% (w/w) as a soluble protein component.

Examples 2, 3 and 4 show additional butter creme-type icing or filling formulations that utilize triglyceride fat components emulsifiers, protein and other components in the practice of the invention.

EXAMPLE 2 Chocolate BETTERCREME® Icing or Filling 5000 lbs of product were prepared according to a procedure similar to that of Example 1. A 157 gallon quantity of Neutresca® 75-46 vegetable oil was metered into the pasteurizer set on medium agitator speed. 5 pounds of lecithin and 5 pounds of potassium sorbate were each added to the batch following the procedure of Example 1.

275.6 pounds of chocolate flavor premix (instant FREEZE FLO® chocolate BETTERCREME) were then dispersed completely into the oil. 119 gallons of hot water (110° F.) were than added into the pasteurizer with mixing at high agitator speed.

The mixture was then heated to 165° F. during which time the following additional ingredients were dispersed—high fructose corn syrup (228 gallons), salt (7 lbs), polysorbate 60 (14 lbs.) and POLY ALDO HGDSK (5 lbs.).

The resultant composition was then heated to 165° F. and held there for 5 minutes (heating to 165° F. was precisely accomplished by shutting down the heater just as the product attained 161° F.).

The homogenizer and cooler were then used with a two stage homogenation profile (first stage 3000 psi/second stage 500 psi) followed by cooling to 47 to 51° F. Although homogenization may be accomplished in one stage, it is carried out in two stages for best results. For this example, the pressure during the first stage is maintained preferably at a minimum of about 2000 psi and a maximum of about 10,000 psi, most preferably about 3000 psi and the pressure during the second stage is maintained at about 500 to 1,000 psi, preferably about 500 psi.

With respect to the following Examples 3 and 4, the ingredients were added to the batch in the order listed below unless the procedure requires premixing (as aforementioned in Example 2), or otherwise as described below).

EXAMPLE 3 Recipe for BETTERCREME®- for stable high room temperature storage

| Ingred- | Ingredient | | |
| A. ient | Description | Weight (lbs.) | Weight % |
|---|---|---|---|
| (1) | Neutresca ® 75-46 Oil | 1212.0000 | 24.2300 |
| (2) | Lecithin | 5.0000 | 0.1000 |
| (3) | VEGETONE R | | 0.0012 |
| (4) | Potassium Sorbate | 5.0000 | 0.1000 |
| (5) | Premix: Instant FREEZE FLO ® Vanilla BETTERCREME ® | 106.5000 | 2.1300 |
| (6) | Water | 1037.0000 | 20.7238 |
| (7) | Corn Syrup | 2600.0000 | 52.0950 |
| (8) | Salt | 7.0000 | 0.1400 |
| (9) | Polysorbate 60 | 14.0000 | 0.2800 |
| (10) | POLY ALDO HGDSK | 5.00000 | 0.1000 |
| (11) | Cream Flavoring | 5.0000 | 0.1000 |
| | | | 100.00% |

With respect to this Example and in comparison to Example 2 the following steps with respect to preparation of this product are of note: (1) the lecithin and VEGETONE R (Kalsec Company, Kalamazoo, Mich.) were blended together in about 2 gallons of oil for addition to the batch, (2) BETTERCREME® premix (ingredient 5) was dispersed into the batch from bags of premix, (3) ingredients 7 to 10 herein were manipulated in a manner similar to ingredients 5 to 9 of Example 2 and (4) addition of 5 lbs cream flavor component (Flavor Cream Product 74.10492 Bells Flavor and Fragrances, was performed after the step (see Example 1) in which the batch was heated to 165° F. and held there for 5 minutes.

EXAMPLE 4 Whipped Topping of High Temperature and Storage Stability With Good Overrun A whipped topping prepared according to the practice of the invention is prepared as follows. Desirable characteristic of the product include high overrun, tolerance to high speed whipping in, for example, a HOBART mixer, excellent whipped stability, and minimum air cell coalescence when whipped product is placed on cakes and then held refrigerated.

111 gallons of water were metered into a mixer at 180° F. set for low speed agitator mixing. A premix made as needed from 30 lbs of sodium caseinate, 140 lbs of granulated sugar, and 20 lbs of METHOCEL F-50 premium was added to the water and mixed for 3 minutes on high agitator speed after which it was pumped to a pasteurizer (Groen, steam jacketed with capacity of 600 gallons). To recover residual adhering materials, an additional 98 gallons of water were added to the mixer on low speed agitator setting. After 1 minute the rinse water was also transferred to the pasteurizer. The pasteurizer was then maintained at 180° F. to receive additional ingredients as follows.

A premix powder of emulsifier consisting of 23.0 lbs of EMPLEX® sodium stearoyl lactylate flakes, American Ingredients, Kansas city, Mo., and 2.3 grams of mono/diglyercides, product Drewmulse 20, was added to the pasteurizer and blended on high agitator speed for 1 minute.

An additional preblended premix was then added to the pasteurizer and mixed for 1 minute at high speed. This preblend was created of 5.0 lbs of salt, 6.0 lbs of dipotassium phosphate, 2.3 grams of xanthan gum, and also 3.0 pounds of flavor cream Natural, product 47.10492, Bells Flavors and Fragrance, as flavorant.

95 gallons (1056.0 lbs.) of high fructose corn syrup (Hi fructose 42, ISO Sweet 100, Staley) was then blended in at high speed for 1 minute after which agitation in the pasteurizer was stopped. 163 gallons (1225.0 lbs.) of TROPIR-ICH oil, Neutresca® 75-46 Oil of Aarhus Inc., Port Newark, N.J. (itself preblended with 6.80 grams of beta-carotene provided from a 30% w/w stock solution in oil) was added to the pasteurizer followed by mixing at high speed for 1 minute. An additional 98 gallons of water (itself at 160° F.) was then added to the pasteurizer and the temperature of the entire batch was adjusted to 165° F. followed by 5 minutes of high speed mixing. A lightning mixer set to high speed was also used at this point to facilitate mixing.

Homogenation of the whip topping was completed as follows. With the lightning mixer off, agitation in the pasteurizer was set to low speed, for 2 minutes while then maintaining low speed agitation in the pasteurizer. Two stage homogenation was accomplished by setting the second stage at 500 psi and the first stage at 7000 psi following generally the protocol of Example 2 using a high pressure homogenation system followed by cooling of the product through a plate heat exchanger to 40–44° F.

In contrast, whipped topping formulas that do not take advantage of the emulsified triglyceride fat compositions of the invention are as follows.

109 gallons of water are metered (at 160° F.) into the mixer in the presence of steam. As agitation is commenced, exactly 9.8 grams of HERBALOX natural flavor #411902 are added to the batch. Then 25 pounds of RICH'S whipped topping B pre-mix consisting of granulated sugar 38%, POLYALDO HGDSK 26%, salt 24%, sodium alginate 10%, sodium citrate 2% (all w/w) were added. 8.1 pounds of polysorbate 60 (GLYCOSPERSE S20K, product of Lonza Co. Fairlawn, N.J.) were also then added to the batch. 159 gallons of cold water were then metered in, followed by 108 gallons of high fructose corn syrup (ISOSWEET 42 product of A. E. Staley, Decatur, Ind.), after which cooling to below 130° F. was then effected.

A 4% solution of hydroxypropyl methylcellulose (METHOCEL, F-50 premium product of Dow Chemical of Midland, Mich.) was then added to the batch with agitation. Then, 62 gallons of palm kernel oil followed by 90 gallons of coconut oil were added, with an additional 2 gallons of coconut oil being used to disperse 1.5 lbs. of lecithin with the resulting dispersion also then being added to the batch. Agitation which has been maintained during the addition of the aforementioned components, as necessary, was now stopped.

The following ingredients were then added consecutively prior to restarting agitation: (1) Vegetone®, 45.40 grams, (2) artificial vanilla flavor F504309, 0.5 lbs, (3) artificial flavor cream product 50672A of Bells, Chicago, 10 mls, (4) flavor cream N&A 76, 10 mls. Agitation was then commenced with heating of the batch to 115–120° F. which was maintained for 10 minutes with care being taken not to exceed 120° F. Homogenization was conducted using a cycle of 3,000/500 total psi at high speed only, with cooling as above at 40–44° F.

An additional product used typically as a whipped topping base can be prepared as follows:

| Ingred-A. | Ingredient Description | Weight (lbs.) | Weight % |
|---|---|---|---|
| (1) | Water | 750.0000 | 15.0000 |
| (2) | Sugar Granulated | 800.0000 | 16.0000 |
| (3) | Water | 750.0000 | 15.0000 |
| (4) | RICH'S Whip topping B Premix | 95.5000 | 1.90 |
| (5) | Water | 60 gm | 9.88 |
| (6) | Corn Syrup | 533.0000 | 10.6620 |
| (7) | Polysorbate 60 | 15.0000 | 0.3000 |
| (8) | Oil, Palm Kernel | 775.0000 | 15.5000 |
| (9) | Oil, Coconut | 752.5000 | 15.0500 |
| (10) | Oil, Coconut | 22.5000 | 0.4500 |
| (11) | Beta Carotene 30% | | 0.0010 |
| (12) | Lecithin | 7.5000 | 0.16000 |
| (13) | Cream Flavor | 5.0000 | 0.10000 |
| | | | 100.00% |

EXAMPLE 5 Blending of Oil Compositions Useful in the Practice of the Invention

| Test Oil | Partially Hydrogenated PKO[2] | Fully Hydrogenated PKO[3] | Fully Hydrogenated-Stearine PKO | Hydrogenated Palm Stearine |
|---|---|---|---|---|
| (1) 331-1 | 0 | 0 | 93 | 7 |
| (2) 333-2 | 93 | 0 | 0 | 7 |
| (3) 333-3 | 0 | 93 | 0 | 7 |
| (4) 430-1 | 0 | 0 | 100 | 0 |
| (5) 430-2 | 0 | 48 | 48 | 4 |
| (6) | 0 | 96 | 0 | 4 |
| (7) NEUTRESCA 75-46 ® | 0 | 98 | 0 | 2 |

[2]Palm Kernel oil hydrogenated to an iodine value of about 4.
[3]Palm Kernel oil hydrogenated to an iodine value of about 1.

The above-defined triglyceride components consist essentially of the indicated first fractions (from hydrogenated palm kernel oil) and second fractions (typically from fully hydrogenated stearine fraction of palm oil) and were evaluated in the context of non-microbiologically stabilized whipped toppings themselves prepared according to a scaled down version of the procedure of Example 4.

Performance characteristics were as follows:

For the product of test oil 7, a whip time of 2.5–2.9 minutes was determined using a HOBART mixer with wire whip at medium speed, wherein a favorable overrun of 450 to 481% was also recorded. Room temperature stability of the resultant whipped topping, determined by the appearance of visual product coarseness (air cell coalescence) was up to 2 hours (at room temperature) or about 8 days (at refrigeration temperature). Test oils (1), (2) and (3) have excellent overrun. However, owing to the presence of a relatively high second fraction (7%) of hydrogenated palm oil/stearine fraction therein, the products are waxy in the mouth when tasted containing too high a content of solid fat and thereby contributing to an excessive whip time and to only relatively short periods of time, whether at room temperature or refrigerator temperature, for which the whipped state can be maintained. It is expected, However, that this can be remedied, in part, using other emulsifier compositions according to the practice of the invention. Test oils (4) and (5) also performed very well giving excellent overrun (over 400%), and very good organoleptic properties in resultant confections (good clean mouth feel which does not linger). Acceptable whip time of 2 to 4 minutes, excellent room temperature stabilities (in excess of 3 hours), and stability at refrigerator temperatures (at least 6 days in both cases) were also recorded.

EXAMPLE 6 A Preferred Fatty Acid Composition Useful in the Practice of the Invention This Example provides information concerning high lauric oil, product Neutresca 75-46 of Aarhus, Inc., Port Newark, N.J. that is prepared as a blend of 98% (w/w) palm kernel oil hydrogenated to an iodine value of about 1, and 2% (w/w) of fully (iodine value less than about 3) hydrogenated stearine fraction of palm oil.

| | |
|---|---|
| Wiley Melt Point | 113–116° F. |
| Mettler Drop Point | 44.5–46.5° C. |
| Free Fatty Acids (as oleic) | 0.05% Max |
| Free Fatty Acids (as lauric) | 0.04% Max |
| Color (Lovibond) | 1.0 Red Max |
| Color (Lovibond) | 10 Yellow Max |
| Peroxide Value | 1.0 MEG/KG MAX |
| IODINE VALUE | 0.5–2.0 |

Solid Fat Index

| | |
|---|---|
| 50° F. | 70–74 |
| 70° F. | 63–67 |
| 80° F. | 47–51 |
| 92° F. | 20–24 |
| 100° F. | 9–13 |

Fatty Acid Composition

| | |
|---|---|
| C6 | NIL |
| C8 | 2.5–4.2 |
| C10 | 3.0–4.0 |
| C12 | 44.0–48.0 |
| C14 | 14.0–16.0 |
| C16 | 8.5–10.5 |
| C18:0 | 20.0–23.0 |
| C18:1 | 0–2.0 |
| C18:2 | Nil |
| C18:3 | Nil |
| C20 and above | Nil |

EXAMPLES 7 through 11 describe profiles for particular additional triglyceride fat components that are useful in the practice of the invention.

EXAMPLE 7 Oil Composition 333-1 from Example 5

Chemical and Physical Properties

| | |
|---|---|
| Iodine Value (Wijs) | 1.1 |
| Wiley Melting Point | 110.1 |
| Mettler Dropping Point | 110.7 |

Solid Fat Index

| | |
|---|---|
| at 50 F. | 75.4 |
| at 70 F. | 75.1 |
| at 80 F. | 67.3 |
| at 92 F. | 16.9 |
| at 100 F. | 8.1 |

Fatty Acid Composition

| | |
|---|---|
| C8 | 2.3 |
| C10 | 3.0 |
| C12 | 50.7 |
| C14 | 19.8 |
| C16 | 11.2 |
| C18 | 12.4 |
| C18:1 | 0.6 |

EXAMPLE 8 Oil Composition 333-2 from Example 5

Chemical and Physical Properties

| | |
|---|---|
| Iodine Value (Wijs) | 4.3 |
| Wiley Melting Point | 113.7 |
| Mettler Dropping Point | 113.5 |

Solid Fat Index

| | |
|---|---|
| at 50 F. | 72.5 |
| at 70 F. | 63.5 |
| at 80 F. | 43.9 |
| at 92 F. | 20.5 |
| at 100 F. | 12.9 |

Fatty Acid Composition

| | |
|---|---|
| C8 | 3.3 |
| C10 | 3.2 |
| C12 | 43.3 |
| C14 | 14.7 |
| C16 | 11.0 |
| C18:0 | 19.6 |
| C18:1 | 4.9 |

EXAMPLE 9 Oil Composition 333-3 from Example 5

Chemical and Physical Properties

| | |
|---|---|
| Iodine Value (Wijs) | 1.0 |
| Wiley Melting Point | 117.13 |
| Mettler Dropping Point | 117.3 |

Solid Fat Index

| | |
|---|---|
| at 50 F. | 73.7 |
| at 70 F. | 67.0 |
| at 80 F. | 50.5 |
| at 92 F. | 27.9 |
| at 100 F. | 17.4 |

Fatty Acid Composition

| | |
|---|---|
| C8 | 3.6 |
| C10 | 3.3 |
| C12 | 44.0 |
| C14 | 14.9 |
| C16 | 10.9 |
| C18 | 23.3 |

EXAMPLE 10 Oil Composition 430-1 from Example 5

Chemical and Physical Properties

| | |
|---|---|
| Iodine Value (Wijs) | 0.4 |
| Wiley Melting Point | 100.0 |
| Mettler Dropping Point | 99.3 |

Solid Fat Index

| | |
|---|---|
| at 50 F. | 75.9 |
| at 70 F. | 77.3 |
| at 80 F. | 72.4 |
| at 92 F. | 11.9 |
| at 100 F. | 0.6 |

EXAMPLE 11 Oil Composition 430-2 from Example 5

Chemical and Physical Properties

| | |
|---|---|
| Iodine Value (Wijs) | 0.02 |
| Wiley Melting Point | 113.0 |
| Mettler Dropping Point | 112.3 |

Solid Fat Index

| | |
|---|---|
| at 50 F. | 74.7 |
| at 70 F. | 72.8 |
| at 80 F. | 62.8 |
| at 92 F. | 20.4 |
| at 100 F. | 9.7 |

EXAMPLE 12 Fatty Acid Composition of Various Oils Useful in the Practice of the Invention

| | Palm | Hydrogenated Palm Oil Stearine | Beef Fat | Natural Palm Kernel Oil | Partially Hydrogenated Palm Kernel Oil | Partially Hydrogenated Coconut Oil | Natural Coconut Oil |
|---|---|---|---|---|---|---|---|
| C4 | 0 | 0 | 2.8 | 0 | 0 | 0 | 0 |
| C6 | 0 | 0 | 2.3 | 0.2 | 0.2 | 1.0 | 0 |
| C8 | 0 | 0 | 1.0 | 3.3 | 3.0 | 9.3 | 7.6 |
| C10 | 0 | 0 | 3.0 | 3.0 | 3.0 | 6.4 | 6.1 |
| C12 | 0.2 | 0.7 | 2.9 | 49.0 | 49 | 48.0 | 47.2 |
| C14 | 1.2 | 1.5 | 9.0 | 16.0 | 16 | 17.5 | 18.8 |
| C16 | 45.5 | 55.0 | 24.0 | 8.0 | 8 | 8.2 | 9.3 |
| C18 | 4.3 | 41.8 | 13.2 | 2.5 | 15 | 9.4 | 3.0 |
| C18:1 | 38.5 | 1.0 | 30.0 | 15.3 | 5 | 0 | 6.4 |
| C18:2 | 10.3 | 0 | 2.0 | 2.20 | 0 | 0 | 1.5 |
| C18:3 | 0 | 0 | 2.0 | 0 | 0 | 0 | 0 |

EXAMPLE 13 Recipe for BETTERCREME®-Icing Using Sodium Stearoyl Lactylate Emulsifier

| Ingred-ient | Ingredient Description | Weight (lbs.) | Weight % |
|---|---|---|---|
| (1) | Water | 976.8750 | 19.5395 |
| (2) | Premix Whip Topping | 101.0100 | 2.0202 |
| (3) | Sodium Stearoyl Lactylate | 23.0000 | 0.4600 |
| (4) | Cream Flavor | 3.0000 | 0.0600 |
| (5) | Corn Syrup | 2671.0000 | 53.4200 |
| (6) | Modified Palm Kernel oil | 1225.0000 | 24.5000 |
| (7) | Beta Carotene Stock | 6.8 gm | 0.0003 |
|  |  |  | 100.00% |

An improved icing product using sodium stearoyl lactylate emulsifier was prepared according to the following recipe. 111 gallons of water are metered into a NORMAN blender at 165–175° F. Using low speed mixing, the Premix topping component (see below) was added to the blender. 23 pounds of EMPLEX® sodium stearoyl lactylate was then added to the pasteurizer with mixing at high speed setting for 1 minute. Cream flavor (product 47.10492 of Bell) was then added with high speed mixing for one minute. Agitation in the pasteurizer was then stopped. 1225 lbs. of modified palm kernel oil (Neutresca 75-46) was then added with mixing (an equivalent amount of palm kernel oil hydrogenated to an iodine value of about 1 can be substituted). As above, the oil contained a small amount of beta carotene from a 30% stock solution.

The whip topping premix (ingredient 2) added above consists of (per batch) sodium caseinate (300 pounds), granulated sugar (400 pounds), hydroxypropylmethylcellulose F-50 premium (200 lbs.), salt (50 lbs.), dipotassium phosphate (60 lbs), 22.90 grams of mono and diglycerides product (BFP 74K), and xanthan gum (22.90 grams).

EXAMPLE 14 RECIPE FOR VANILLA BETTERCREME® THAT CAN BE SOLD IN FROZEN PRE-WHIPPED FORM FOR CAKE ICING

| Ingredient | Ingredient Description | Weight (lbs.) | Weight % |
|---|---|---|---|
| (1) | Hydrogenated Palm Kernel Oil | 1212.0000 | 24.2300 |
| (2) | Lecithin | 5.0000 | 0.1000 |
| (3) | Potassium Sorbate | 5.0000 | 0.1000 |
| (4) | Premix, instant FREEZE FLO ® Vanilla BETTERCREME ® | 111.5000 | 2.2300 |
| (5) | Water | 1015.0000 | 20.3250 |
| (6) | Corn Syrup High Fructose | 2600.0000 | 51.9950 |
| (7) | Salt | 7.0000 | 0.1400 |
| (8) | Polysorbate 60 | 14.0000 | 0.2800 |
| (9) | POLY ALDO HGDSK | 5.0000 | 0.1000 |
| (10) | Artificial Vanilla Flavor | 25.0000 | 0.5000 |

EXAMPLE 15: EXAMPLE OF TOPPING PRODUCT WITH NO EXOGENOUS SOURCE OF EMULSIFIER

This Example provides for a whipped product in which egg is the sole source of emulsifier and stabilizer therein. A 5000 pound quantity thereof is prepared from 1,225 lbs of modified palm kernel oil (Neutresca® 75-46), 238 lbs of non-fat milk, 30 lbs of milk protein isolates, 296 gallons of water, 825 lbs of granulated sugar, and 250 lbs of frozen sugared egg yolks (about 10% sugar with 90% of yolks) as provided from Hygrade Egg Products, Inc., Elizabeth, N.J. This formulation may be processed as set forth in Example 13, as well as mixed, pasterized, and packaged employing conventional egg-food containing processing techniques.

EXAMPLE 16: STRAWBERRY JUBILEE TARTS

| 1 pound | whip topping according to Example 4 |
|---|---|
| 1 pound | sour cream |
| 2½ teaspoons | vanilla extract |
| 4 pounds | strawberry pie filling |
| 50 - 3 inch | tart shells |
| 2 bags | RICH'S ® ON TOP ® Dessert Topping |
| 50 | fresh strawberries |

Whip whip topping at medium speed to full volume.
Turn machine to low and blend in sour cream and vanilla extract.
Fold in strawberry pie filling.
Fill tart shells or parfait glasses and chill. Garnish with a fleur de lis design using RICH'S® ON TOP® and a fresh strawberry.

EXAMPLE 17: ROCKY ROAD PIE

| 1 quart | whip topping according to Example 4 |
|---|---|
| 5 pounds | vanilla pudding |
| 1 pound | pistachio instant pudding and pie filling mix |
| 2 pounds | drained, crushed pineapple |
| 8 ounces | miniature Colored marshmallows |
| 6 - 10– | pie shells |
| 2 bags | RICH'S ® ON TOP ® Dessert Topping |

Whip whip topping at medium speed until soft peaks form. Continue whipping and add vanilla pudding and instant pudding mix. Whip until completely incorporated. Fold in pineapple and marshmallows.
Fill pie shells and chill. Using RICH'S® ON TOP®, decorate each pie with a reverse shell border.

EXAMPLE 18: ANGEL SURPRISE CAKE

| 1 pound | angel food cake |
|---|---|
| 3 ounces | strawberry gelatin |
| 1 cup | boiling water |
| 1 cup | vanilla ice cream |
| 8 ounces | cream cheese, softened |
| ½ cup | sugar |
| 1 teaspoon | vanilla extract |
| 8 ounces | whip topping according to Example 4 |
| 1 cup | strawberries, sliced |
| 1 cup | pecans, chopped |

Remove brown crust from cake. Cut into small cubes and set aside.
Dissolve gelatin in boiling water. Blend in ice cream and chill until slightly thickened.
Whip cream cheese, sugar and vanilla until smooth, set aside. Whip whip topping at medium speed to full volume. Fold in cream cheese mixture. Add gelatin mixture and blend. Fold in strawberries, nuts and cake cubes.
Spray bundt pan with food release spray. Pour in topping mixture and refrigerate for 2–3 hours or overnight.
Remove cake from bundt pan and ice with strawberry topping*.

*Whip 8 ounces whip topping at medium speed until foamy. Add ½ cup powdered sugar and 1 teaspoon vanilla extract; continue whipping to full volume. Fold in one cup chopped strawberries.

EXAMPLE 19: CASSATA CAKE

| | |
|---|---|
| 1 | 1/4 sheet cake (yellow, white or chocolate) |
| ¼ cup | almond liqueur |
| ¼ cup | cherry juice |
| 2 cups | ricotta cheese |
| ½ cup | sugar |
| 1½ teaspoons | almond extract |
| ¼ cup | chocolate, shaved |
| ¼ cup | maraschino cherries, drained, chopped |
| ¼ cup | almond slivers |
| ¼ cup | glazed citron, chopped |
| 16 ounces | whip topping according to Example 4 |
| ¼ cup | almond liqueur |

Slice sheet cake through the thickness and then lengthwise to form 4—4"×12" layers.
Mix ¼ cup almond liqueur with cherry juice and drizzle over all 4 layers.
Thoroughly blend ricotta cheese, sugar and almond extract. Fold in chocolate, cherries, almonds and citron.
Whip whip topping at medium speed to full volume. Fold 3 ounces of whip topping into ricotta cheese mixture.
Top 3 layers of cake each with ⅓ ricotta cheese mixture. Stack to form 4-layer cake with plain layer on top.
Fold ¼ cup almond liqueur into remaining whipped whip topping. Pipe with a plain tip over top and side of cake with ice with a spatula.
Garnish with stemmed maraschino cherries, chocolate curls, and almond slivers, if desired.

EXAMPLE 20: CRANBERRY RASPBERRY WHIP

| | |
|---|---|
| 24 ounces | raspberry flavored gelatin |
| 4 pounds | pear juice |
| 2 quarts | whip topping according to Example 4 |
| 1 - #10 can | jellied cranberry sauce |
| 2 - #10 cans | pears, drained, diced |

Dissolve gelatin in heated pear juice and cool until the consistency of egg whites.
Whip whip topping at medium speed to full volume. Turn machine to low and blend in cranberry sauce. Stream in thickened gelatin.
Fold in drained pears. Pour into 4-18"×26" bun pans or individual serving dishes and refrigerate.
Using a large shell design, garnish with RICH'S® ON TOP® Dessert Topping, if desired.

EXAMPLE 21: JAMAICAN COFFEE MOUSSE DESSERT

| | |
|---|---|
| 1 quart | whip topping according to Example 4 |
| 5 pounds | vanilla pudding |
| 10 ounces | instant chocolate pudding mix |
| 3 ounces | coffee liqueur |
| 1 tablespoon | instant coffee crystals |
| ¼ | chocolate sheet cake, crumbled |

Pour whip topping into a chilled bowl and whip to full volume.
Blend instant coffee with coffee liqueur and blend into vanilla pudding. Add instant chocolate pudding and blend until dissolved. Fold whipped whip topping and pudding mixture together.
Sprinkle ⅔ of the cake crumbs over the bottom of a hotel pan (12"×20"×2").
Spoon filling over the crumbs and garnish top with remaining crumbs. Chill for at least 4 hours before cutting.
Serve in squares and garnish with additional whipped whip topping.

EXAMPLE 22: RASPBERRIES WITH DEVONSHIRE CREAM

| | |
|---|---|
| 12 ounces | whip topping aacording to Example 4 |
| 4 tablespoon | sugar |
| 2 teaspoons | vanilla |
| 2 cups | sour cream |
| 1 quart | raspberries |
| 1½ cups | raspberry sauce |

Whip whip topping at medium speed until foamy, add sugar and vanilla and then whip to full volume.
Blend in sour cream. Fill 12 stemmed glasses, leaving 1" headspace.
Top Devonshire Cream with berries and 2 tablespoons of sauce. Garnish with chocolate leaves if desired. Serve immediately.
To prepare Raspberry Sauce*:
Puree 2 cups raspberries in blender. Strain to remove seeds.
In a small saucepan, mix ½ cup sugar and 2 tablespoons cornstarch. Stir in 1 cup water. Cook and stir until mixture thickens and turns clear. Stir in berry puree and bring to a boil. Remove from heat and chill.
For variety, blueberries, strawberries or blackberries can be used.

EXAMPLE 23: CHOCOLATE HAZELNUT CREAM CAKE ROLL

| | |
|---|---|
| ½ cup | flour |
| ¼ cup, 1 tablespoon | cocoa |
| ¼ teaspoon | baking powder |
| ¼ teaspoon | baking soda |
| ⅛ teaspoon | salt |
| 4 | eggs, separated |
| ¾ cup | sugar, divided |
| ¼ cup | water |
| 1 teaspoon | vanilla |
| 12 ounces | whip topping according to Example 4 |
| ¼ cup | hazelnut liqueur |
| ½ cup | hazelnuts, toasted, chopped |
| 4 ounces | semi-sweet chocolate |
| 2 tablespoons | butter |
| 1 teaspoon | vanilla |
| 1 tablespoon | whip topping |

Sift dry ingredients together.
Beat egg whites to soft peaks, gradually add ½ cup sugar. Beat until stiff but not dry.
Beat yolks, ¼ cup sugar, water and vanilla until thick (6 minutes).
On low speed add dry ingredients to egg yolk mixture, then fold in egg whites.
Grease a jelly roll pan, line with buttered wax paper. Spread batter onto wax paper and bake in 350° F. oven for 12–15 minutes.
When done, invert on towel sprinkled with powdered sugar. Roll up from the long side. Cool.
Whip whip topping at medium speed to full volume. Fold in liqueur and ⅓ of cup of nuts.
Unroll cooled cake and spread with ¾ of the whip topping. Re-roll.
Melt chocolate and butter. Blend in vanilla and whip topping. Ice cake roll.
Garnish with remaining whipped whip topping and nuts.

What is claimed is:

1. A whipped topping or whipped filling that is shelf-stable at room temperature, but free from a waxy mouth feel, comprising a whipped oil-in-water emulsion of triglyceride fat comprising a first fraction of vegetable oil having an iodine value of no greater than 5 and a second fraction of hardening fat, said whipped oil-in-water emulsion having a whipping overrun of greater than 300% and including an emulsifier in an amount effective to provide said whipping overrun.

2. The whipped food product of claim 1 wherein said triglyceride fat is comprised of at least about 90% (w/w) of said vegetable oil and about 2 to about 10% of said hardening fat.

3. The whipped food product of claim 1 wherein said vegetable oil is comprised of at least about 50% or more of fatty acids of C14 length or less.

4. The whipped food product of claim 1 wherein said triglyceride fat has a profile of solid fat index of about 70 at 50° F., about 40 to 75 at 80° F., and less than about 20 at 100° F.

5. The whipped food product of claim 1 wherein said hardening fat is comprised of at least about 50% or more of fully saturated fatty acids that are of C16 or C18 length, and wherein at least about 20% of said fully saturated fatty acids are of C16 length.

6. The whipped food product of claim 1 wherein said oil-in-water emulsion further comprises a protein, a sweetener, a stabilizer and a flavorant.

7. The whipped food product of claim 1 wherein said emulsifier is selected from the group consisting of mono and diglycerides, sorbitan monostearate, lecithin, sodium stearoyl lactylate, polysorbate 60 and polyglycerol esters of fatty acids.

8. The whipped food product of claim 6 wherein said protein comprises at least one protein selected from the group consisting of a solubilized milk protein, a water soluble meat protein and a vegetable protein.

9. The whipped food product of claim 1 wherein said food product is a whipped cake icing.

10. The whipped food product of claim 1 wherein said emulsifier is capable of providing a whipping overrun of at least about 400%.

11. The whipped food product of claim 1 wherein said vegetable oil comprises a fat selected from the group consisting of butter oil, palm kernel oil, the oleic fraction of palm kernel oil, the stearine fradtion of palm kernel oil, coconut oil, babassu oil and tucum oil.

12. The whipped food product of claim 1 wherein said vegetable oil comprises palm kernel oil hydrogenated to an iodine value of between about 1 and about 5.

13. The whipped food product of claim 1 wherein said vegetable oil comprises palm kernel oil hydrogenated to an iodine value of about 1.

14. The whipped food product of claim 1 wherein said hardening fat comprises a fat selected from the group consisting of palm oil, cottonseed oil, lard, tallow and a hydrogenated fraction of any thereof.

15. The whipped food product of claim 1 wherein said triglyceride fat comprises about 2 to about 4% (w/w) of said hardening fat.

16. The whipped food product of claim 1 wherein said triglyceride fat comprises about 98% of said vegetable oil and about 2% of said hardening fat, said vegetable oil comprises palm kernel oil hydrogenated to an iodine value of about 1 and said hardening fat comprises a hydrogenated stearine fraction of palm oil.

17. A method for preparing a whipped food product comprising:
preparing an oil-in-water emulsion of triglyceride fat comprised of a first fraction of vegetable oil having an iodine value of no greater than 5 and a second fraction of hardening fat to provide structural stability of the whipped food product at room temperature, but without waxy mouth feel, said oil-in-water emulsion including an emulsifier in an amount effective to provide a whipping overrun of between greater than 300% and at least 500%;
including said oil-in-water emulsion in a whippable food product; and
whipping said oil-in-water emulsion to produce a whipped food product having an overrun.

18. The method according to claim 17 wherein said triglyceride fat is comprised of at least about 90% (w/w) of said vegetable oil and about 2 to about 10% of said hardening fat.

19. The method according to claim 17 wherein said stable whipped confection is selected from the group consisting of a whipped topping, a whipped icing and a whipped filling formulation.

20. The method according to claim 17 wherein at least about 50% or more of the fatty acids of said vegetable oil are of C14 length or less.

21. The method according to claim 17 wherein said triglyceride fat has a profile of solid fat index of about 70 at 50° F., about 40 to 75 at 80° F., and less than about 20 at 100° F.

22. The method according to claim 17 wherein said hardening fat is comprised of at least about 50% or more of fully saturated fatty acids that are of C16 or C18 length, and wherein at least about 20% of said fully saturated fatty acids are of C16 length.

23. The method according to claim 17 wherein said oil-in-water emulsion further comprises a protein, a sweetener, a stabilizer and a flavorant.

24. The method according to claim 17 wherein said triglyceride fat comprises about 2 to about 4% (w/w) of said hardening fat.

25. The method according to claim 17 wherein said emulsifier is capable of providing a whipping overrun of at least about 400%.

26. A whipped confection that is shelf-stable at room temperature, but free from a waxy mouth feel, comprising a whipped oil-in-water emulsion of triglyceride fat comprised of a first fraction of vegetable oil having an iodine value of no greater than 5 and a second fraction of a hardening fat to provide structural stability of the whipped confection at room temperature, said whipped oil-in-water emulsion having a whipping overrun of between greater than 300% and at least about 500% and including an emulsifier in an amount effective to provide said whipping overrun, and said oil-in-water emulsion further comprising water, a protein, sweetener and stabilizer.

27. The whipped confection of claim 26 wherein said triglyceride fat is comprised of at least about 90% (w/w) of said vegetable oil and about 2 to about 10% of said hardening fat.

28. The whipped confection of claim 26 wherein said triglyceride fat comprises 98% of said vegetable oil and 2% of said hardening fat, said vegetable oil comprises palm kernel oil hydrogenated to an iodine value of about 1 and said hardening fat comprises a hydrogenated stearine fraction of palm oil.

29. The whipped confection of claim 26 wherein said emulsifier comprises sodium stearoyl lactylate.

30. The whipped confection of claim 29 wherein said emulsifier is comprised of about 0.46% of said sodium stearoyl lactylate.

31. The whipped confection of claim 26 wherein said protein is comprised of sodium caseinate.

* * * * *

UNITED STATES PATENT AND TRADEMARK OFFICE
CERTIFICATE OF CORRECTION

PATENT NO. : 6,203,841 B1
DATED : March 20, 2001
INVENTOR(S) : Robert J. Lynch et al.

It is certified that error appears in the above-identified patent and that said Letters Patent is hereby corrected as shown below:

<u>Column 4,</u>
Line 33, change "450" to -- 45° --.

<u>Column 13,</u>
Line 58, change "is" to -- are --.

<u>Column 14,</u>
Line 39, after "Burrell" insert -- , --.

Signed and Sealed this

Twenty-second Day of January, 2002

Attest:

Attesting Officer

JAMES E. ROGAN
*Director of the United States Patent and Trademark Office*